(12) United States Patent　　(10) Patent No.:　　US 7,181,117 B2
Taillon　　(45) Date of Patent:　　Feb. 20, 2007

(54) FRACTIONAL CLADDING FOR OPTICAL FIBERS

(75) Inventor: Yves Taillon, Saint-Augustin-de-Desmaures (CA)

(73) Assignee: Institut National D'Optique, Sainte-Foy (CA)

( * ) Notice: Subject to any disclaimer, the term of this patent is extended or adjusted under 35 U.S.C. 154(b) by 88 days.

(21) Appl. No.: 11/087,826

(22) Filed: Mar. 24, 2005

(65) Prior Publication Data

US 2006/0215977 A1　　Sep. 28, 2006

(51) Int. Cl.
　　*G02B 6/02*　　(2006.01)
(52) U.S. Cl. .................... 385/126; 385/27; 385/31; 385/123
(58) Field of Classification Search ................ 385/27, 385/31, 123, 126
See application file for complete search history.

(56) References Cited

U.S. PATENT DOCUMENTS 5,268,978 A * 12/1993 Po et al. ................ 385/33

* cited by examiner

*Primary Examiner*—Frank G. Font
*Assistant Examiner*—Michael P. Mooney
(74) *Attorney, Agent, or Firm*—Ogilvy Renault LLP

(57) ABSTRACT

An optical fiber system comprises an optical fiber having a doped core and a first cladding about the doped core. The optical fiber has a first longitudinal portion and a second longitudinal portion, and is arranged such that the first longitudinal portion and the second longitudinal portion are longitudinally side by side. The first cladding of the first longitudinal portion is adjacent to the first cladding of the second longitudinal portion such that light propagating in the first cladding can move laterally from the first longitudinal portion to the second longitudinal portion to increase the amount of light reaching the doped core. The optical fiber is adapted to be coupled to a power input and has an output end for outputting light emitted by the doped core. The second fractional cladding about the first cladding conceals light in the first cladding.

13 Claims, 6 Drawing Sheets

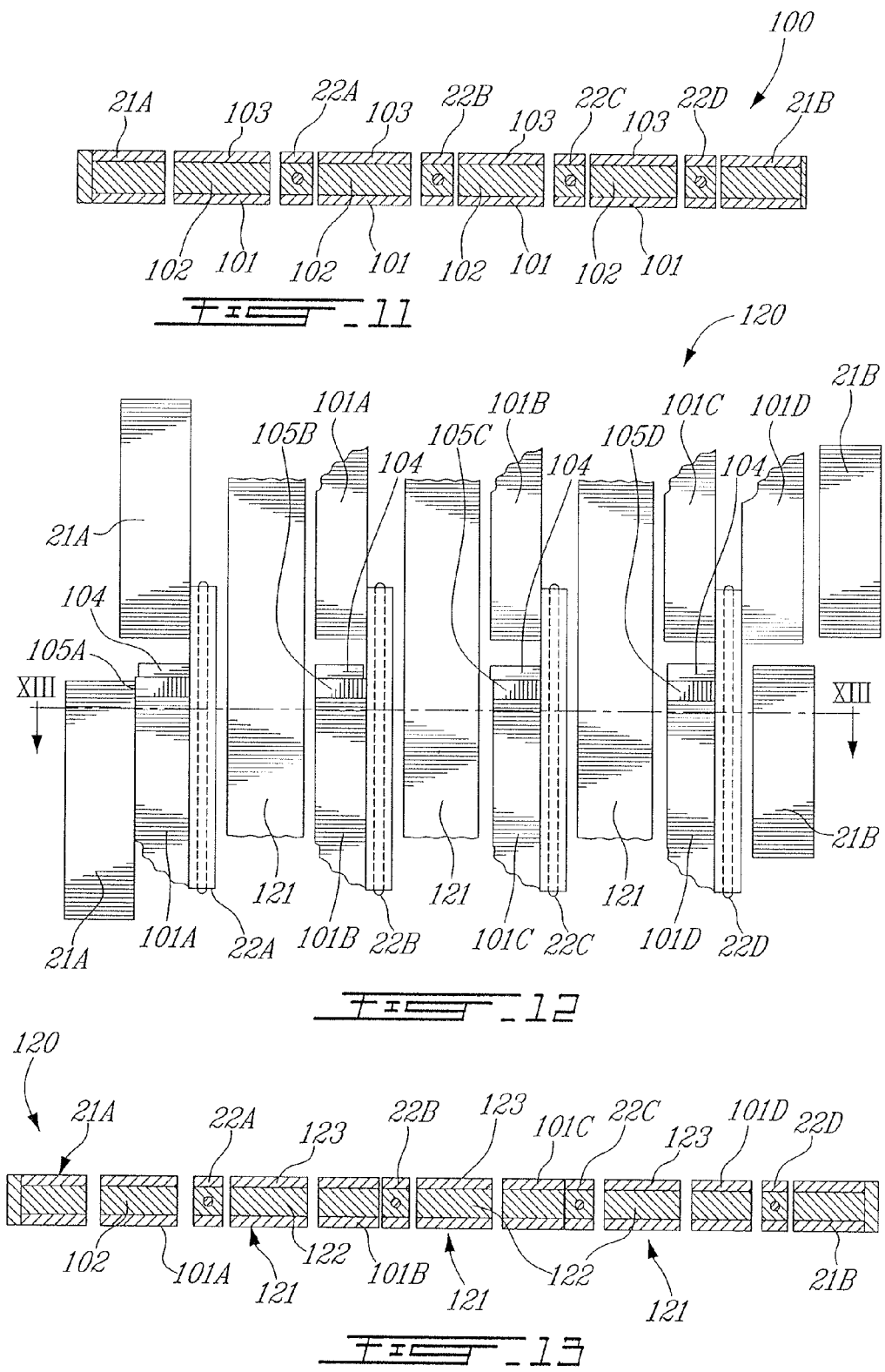

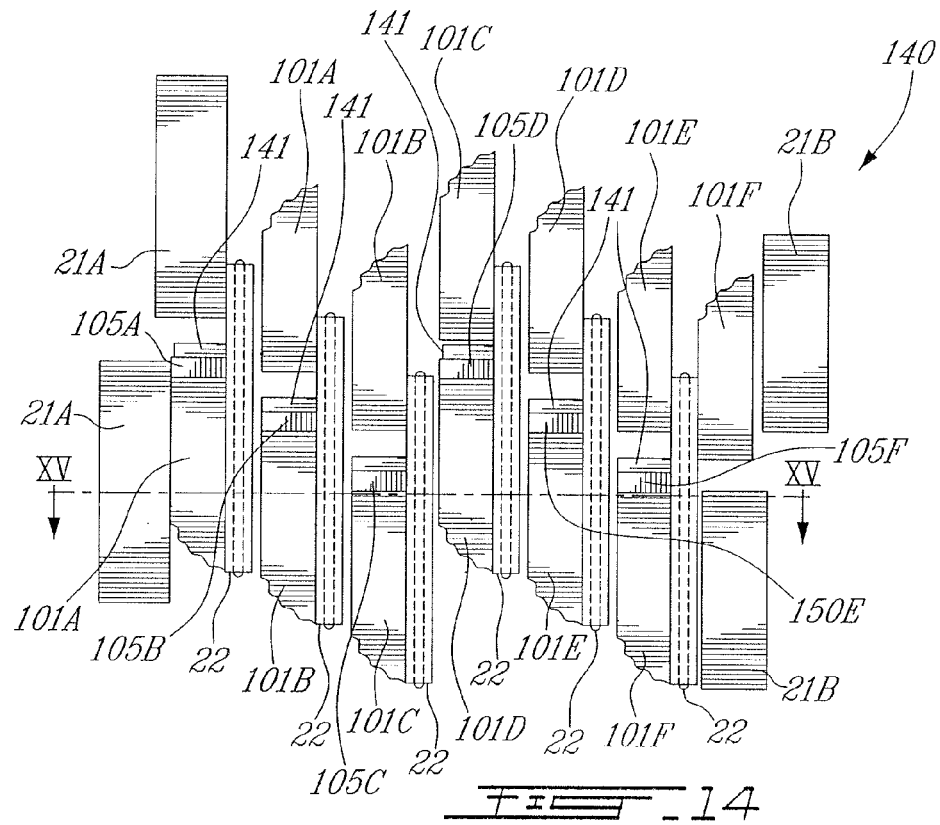
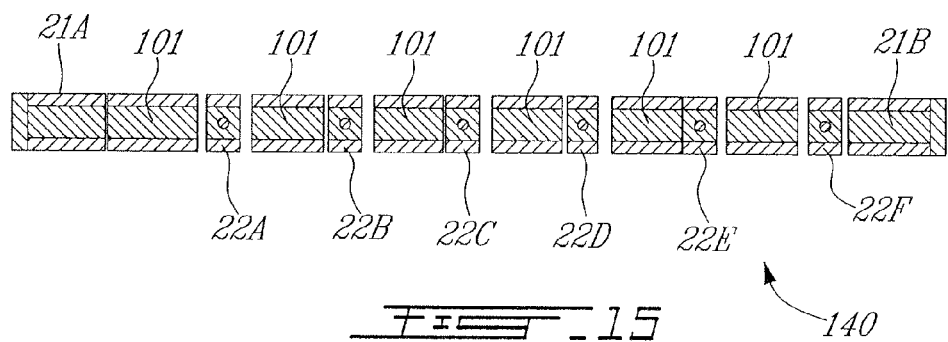
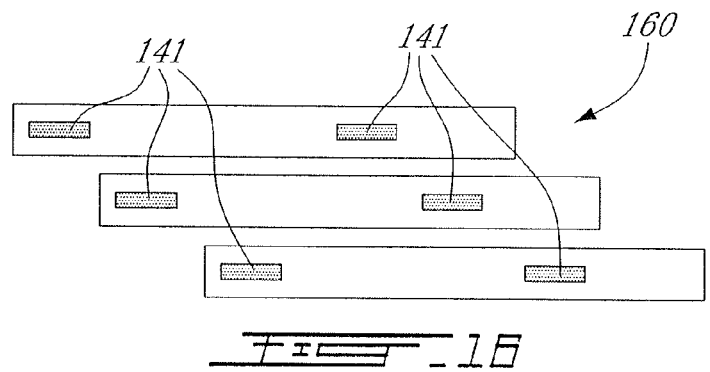

FRACTIONAL CLADDING FOR OPTICAL FIBERS

BACKGROUND OF THE INVENTION

1. Field of the Invention

The present invention generally relates to fiber optics and, more particularly, to a cladding configuration for increasing the efficiency of a multiclad optical fiber.

2. Background Art

There is a demand for fiber optics of increased output power. Amongst the solutions for obtaining fiber optics of increased output power, the input pump power (for example, a pump from a laser diode) can be increased. However, the coupling of the input power into the optical fiber is subjected to losses of light as the pump width typically increases with the output power, and coupling efficiencies then limit the upgrading of the power input. Pumping also increases in cost with lower coupling efficiencies.

Another solution to increasing the output power of an optical fiber system is to increase the coupling efficiency between the input power and the optical fiber. The pump source is positioned at an input end of an optical fiber. The diameter of the optical fiber is a limitation to the coupling efficiency. Hence, various configurations have been provided to overcome this limitation and thereby increase the input pump power in optical fibers. U.S. Pat. No. 5,268,978, issued to Po et al. on Dec. 7, 1993, discloses an optical fiber laser and geometric coupler. More precisely, the coupling efficiency between a light source and an output optical fiber is increased by providing coupling means and a cylindrical lens therebetween. The coupling means include a plurality of input optical fibers having respective input ends, each associated with a light-emitting facet of the light source. Each of these input optical fibers has an output end. A cylindrical lens is positioned between the output ends of the plurality of input optical fibers and the output optical fiber to focus light emerging from the facets onto the input end of the output optical fiber.

It is also known to increase the coupling surface between the power input and the optical fiber. For instance, U.S. Pat. No. 4,815,079, issued to Snitzer et al. on Mar. 21, 1989, describes a fiber-optic arrangement wherein a side-pumping input fiber is coupled longitudinally to an optical fiber so as to increase the coupling surface between the power input and the optical fiber. This is generally illustrated in FIG. 1 of the prior art, wherein the optical fiber is shown at 10 and the side-pumping input fiber is shown at 11. The side-pumping fiber 11 is the pump source for the optical fiber 10. The optical fiber 10 has a doped core 12, a first cladding 13, and a second cladding 14. The second cladding 14 defines the outer periphery of the optical fiber 10. A portion of the second cladding 14 is removed so as to expose the first cladding 13 of the optical fiber 10. The side-pumping input fiber 11 has a core 15 and a first cladding 16. A portion of the first cladding 16 of the side-pumping input fiber 11 is removed such that the first cladding 15 is exposed. Accordingly, the optical fiber 10 and the side-pumping input fiber 11 are interconnected by the exposed portions of the first cladding 13 of the optical fiber 10 and the core 15 of the side-pumping input fiber 11 being coplanar. An affixing material (not visible) may bond the optical fiber 10 to the side-pumping input fiber 11. The indexes of refraction are such that light from the side-pumping input fiber 11 is coupled into the optical fiber 10 to potentially be absorbed by the doped core 12. The interface surface between the pump source (i.e., the fiber 11) and the optical fiber 10 can thus be adjusted, so as to maximize the amount of the light from the pump source reaching the optical fiber 10, and thus improving the coupling efficiency therebetween.

Although the coupling efficiency between pump source and optical fiber has improved as a result of novel configurations such as the ones described above, other configurations providing further coupling efficiency improvements and doped core absorption efficiency are desirable particularly for taking advantage of still higher power pump sources.

SUMMARY OF INVENTION

It is therefore an aim of the present invention to provide a novel optical fiber configuration for improving the coupling efficiency of high-power pump source or sources into an optical fiber.

It is a further aim of the present invention to provide a novel optical fiber configuration for improving and adjusting the absorption efficiency of a doped core fiber of an optical fiber.

It is a still further aim of the present invention to provide fiber optics designs that allow adjustment of a length and a width of contact between the pump source and the optical fiber.

It is a still further aim of the present invention that the optical fiber configuration includes an increase in interface surface between a power input and an optical fiber.

Therefore, in accordance with the present invention, an optical fiber system comprising an optical fiber having a doped core and a first cladding about the doped core, the optical fiber having a first longitudinal portion and a second longitudinal portion, the optical fiber being arranged such that the first longitudinal portion and the second longitudinal portion are longitudinally side by side with a portion of the first cladding of the first longitudinal portion being adjacent to a portion of the first cladding of the second longitudinal portion such that light propagating in the first cladding can move laterally from the first longitudinal portion to the second longitudinal portion to increase the amount of light reaching the doped core, the optical fiber adapted to be coupled to a power input to receive a light input and having an output end for outputting light emitted by the doped core; and a second fractional cladding about the first cladding to conceal light in the first cladding.

Further in accordance with the present invention, there is provided an optical fiber system comprising an optical fiber having a doped core, a first cladding about the doped core, and a second cladding partially covering the first cladding such that the first cladding is exposed longitudinally, the optical fiber having at least a first longitudinal portion and a second longitudinal portion, the optical fiber being arranged such that the first longitudinal portion and the second longitudinal portion are longitudinally side by side with an exposed portion of the first cladding of the first longitudinal portion being adjacent to an exposed portion of the first cladding of the second longitudinal portion such that light propagating in the first cladding can move laterally from the first longitudinal portion to the second longitudinal portion to increase the amount of light reaching the doped core, the optical fiber adapted to be coupled to a power input to receive a light input and having an output end for outputting light emitted by the doped core; and at least one contour fiber having an index of refraction as a function of the optical fiber, the at least one contour fiber covering further exposed portions of the first cladding of the doped core fiber to conceal light in the first cladding.

BRIEF DESCRIPTION OF THE DRAWINGS

Having thus generally described the nature of the invention, reference will now be made to the accompanying drawings, showing by way of illustration a preferred embodiment thereof and in which:

FIG. 11 is a cross-section view taken along cross-section line XI—XI of FIG. 10;

FIG. 12 is a top plan view of the optical fiber system in accordance with a seventh embodiment of the present invention, in a coupling configuration with a power input;

FIG. 13 is a cross-section view taken along cross-section line XIII—XIII of FIG. 12;

FIG. 14 is a top plan view of the optical fiber system in accordance with an eighth embodiment of the present invention, in a coupling configuration with a power input;

FIG. 15 is a cross-section view taken along cross-section line XV—XV of FIG. 14; and FIG. 16 is a schematic top plan view of power input arrays to be used with the optical fiber system of the present invention.

DESCRIPTION OF THE PREFERRED EMBODIMENTS

Figure 1:
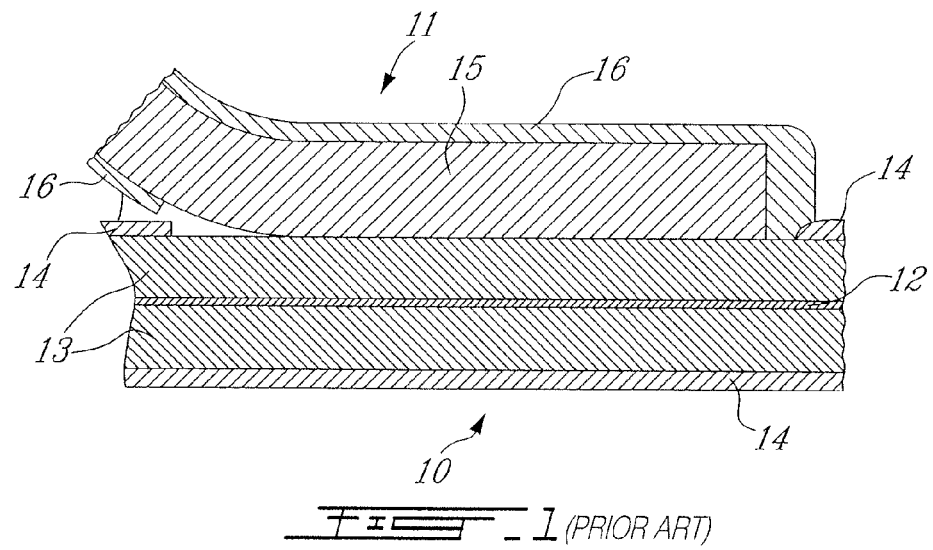
FIG. 1 is a longitudinal cross-section view of a coupling configuration of the prior art between an optical fiber and a power input.
Figure 2:
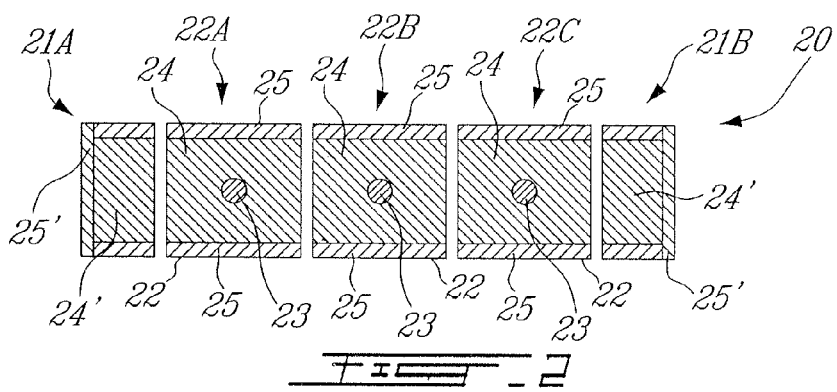
FIG. 2 is a cross-section view of an optical fiber system in accordance with the present invention.
Figure 5:
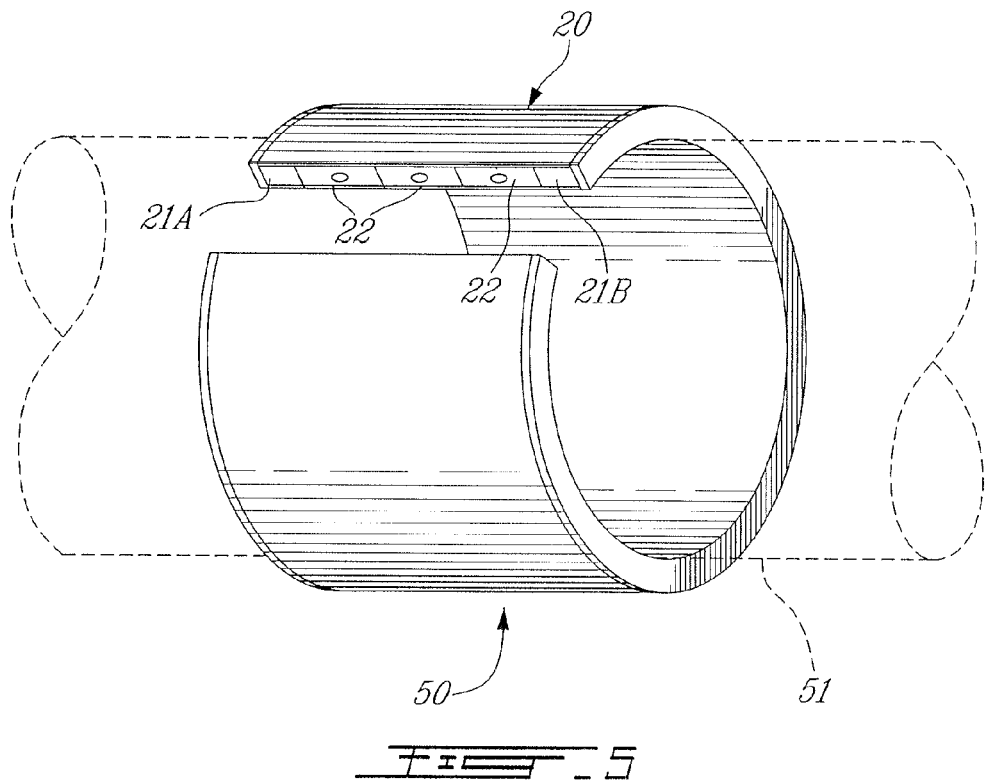
FIG. 5 is a perspective view, partly cross-sectioned, of an arrangement producing the optical fiber system of the present invention.
Figure 6:
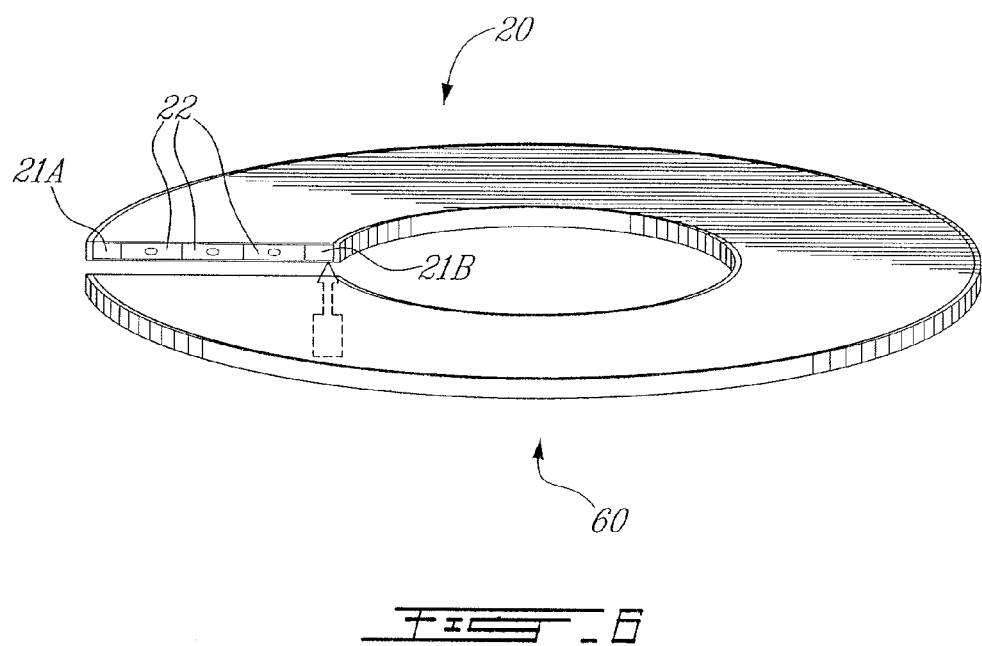
FIG. 6 is a perspective view, partly cross-sectioned, of an alternative arrangement producing the optical fiber system of the present invention.

Referring now to the drawings, and more particularly to FIG. 2, an optical fiber system in accordance with the present invention is generally shown at 20. The optical fiber system 20 has contour fibers 21A and 21B, and one optical fiber 22, having portions 22A, 22B and 22C. The portions 22A, 22B and 22C of the optical fiber 22 are cross-sections at various longitudinal positions of the optical fiber 22. As will be described hereinafter, the optical fiber 22 is arranged such that portions thereof are side by side. For instance, as shown in FIGS. 5 and 6, cylindrical and annular arrangements are shown forming the optical fiber system 20.

The optical fiber 22 has a doped core 23, a first cladding 24 and a second cladding 25. The second cladding 25 covers a pair of opposed surfaces of the first cladding 24, whereby it is referred to as fractional. This configuration allows for side-by-side portions of the optical fiber 22 (i.e., portions 22A and 22B, or portions 22B and 22C) to have longitudinal portions of the first cladding 24 coplanar (although the side-by-side optical fiber portions are shown separated throughout most of the figures to better illustrate the cross-sections of the optical fiber, they are in fact in contact). The optical fiber 22 is a typical optical fiber, wherein the index of refraction increases from the fractional cladding 25 to the first cladding 24, and from the first cladding 24 to the doped core 23, whereby light will be guided toward the doped core 23 so as to maximize and/or optimize the amount of light absorbed by the doped core 23.

Returning to FIG. 2, the contour fibers 21A and 21B are shown both having a core 24' (which can be single mode or multimode) and a cladding 25'. The cladding 25' covers three of the four faces of the core 24', such that, in the optical fiber system 20, the first cladding 24 and the core 24' are concealed by the fractional cladding 25 and 25'. The core 24' is preferably of the same material, with the same index of refraction as the first cladding 24, whereas the fractional cladding 25' is preferably of the same material and has the same index of refraction as the fractional cladding 25. It is pointed out that the contour fiber could simply be a cladding having an index of refraction at most equal to the index of refraction of the fractional cladding 25 of the optical fiber 22, to reflect/guide light of the optical fiber 22 projected thereon.

Figures 3, 4:
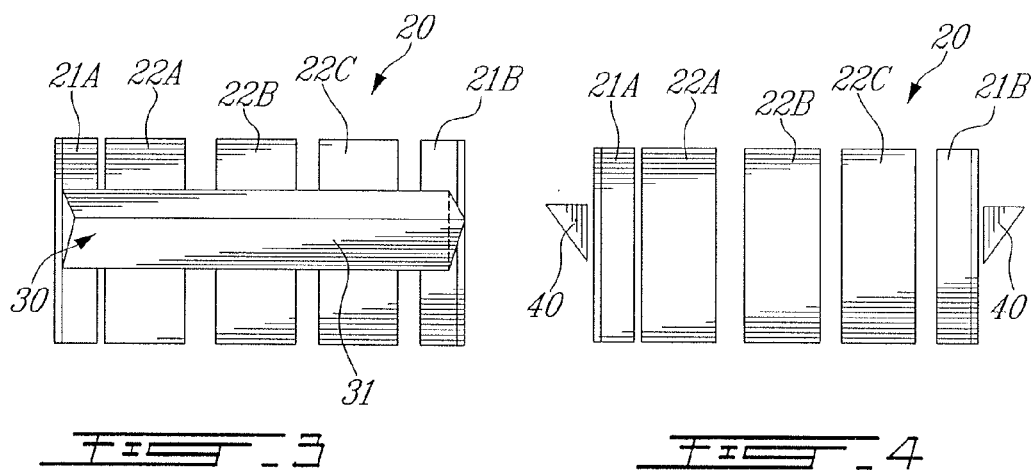
FIG. 3 is a top plan view, fragmented, of the optical fiber system in a coupling configuration of the present invention with a power source.
FIG. 4 is a top plan view, fragmented, of the optical fiber system in an alternative coupling configuration of the present invention with a power source.

Referring to FIG. 3, coupling means 30 is shown mounted to the optical fiber system 20. More specifically, the coupling means 30 is illustrated as a triangular base prism, positioned so as to longitudinally overlap the portions 22A, 22B and 22C of the optical fiber 22. The prism has a surface 31 being shaped as an elongated rectangle. Therefore, a bar of lights/lasers can be coupled to the surface 31, so as to transmit pump power to the optical fiber system 20 via the coupling means 30. It is observed that, with the above-described coupling configuration, the coupling surface between the power input (via the coupling means 30) and the optical fiber system 20 can be substantially the same as the output surface of the power input (not shown). Therefore, it is not essential to have optical elements that will have the light input from the power input converge into the optical fiber system 20.

The coupling means 30 can be mounted directly onto the second cladding 25 and cladding 25'. Alternatively, a portion (not shown) of the second cladding 25 and cladding 25' may be removed from the optical fiber 22 and contour fibers 21, respectively, such that the coupling means 30 directly contacts the first cladding 24 and core 24'. In either case, the indexes of refraction must be chosen to maximize the amount of light from the power input pumped in the first cladding 24 and core 24' to increase the amount of light absorbed by the doped core 23.

Referring to FIG. 4, coupling means 40 are shown mounted to the optical fiber system 20. However, as opposed to the embodiment of FIG. 3, the coupling means 40 are mounted to lateral portions of the contour fibers 21A and 21B. The coupling means 40 can be mounted directly to the cladding 25' or, alternatively, to the core 24' (not illustrated in FIG. 2).

Light will therefore be coupled laterally and thus be transmitted from optical fiber portion to optical fiber portion, and is thus likely to cross the doped core 23 to be absorbed thereby. Yet, the optical fiber 22 has a simple cross-section (e.g., square, as illustrated in FIG. 2B), that involves relatively low costs in manufacturing. More complex cross-sections (e.g., hexagonal cross-section or cross-sections involving a nonconcentric doped core) have been provided to increase the probability that light crosses the doped core so as to maximize the amount of light absorbed by the doped core 23. Such optical fibers with more complex cross-sections can also be used with the optical fiber system 20 (although not shown).

Referring to FIG. 5, an arrangement of the optical fiber 22 in accordance with the optical fiber system 20 is shown at 50. In this arrangement, the optical fiber 22 is rolled onto a cylinder 51, so as to form a three-dimensional spiral. A portion of the optical fiber 22 has been removed to illustrate the cross-section. The contour fibers 21A and 21B are also shown in FIG. 5, preventing the light from being transmitted out of the optical fiber system 20. The power input may be mounted to the optical fiber configuration 20 according to the embodiments of FIG. 3 or FIG. 4, or may be coupled in any other suitable way. For instance, a free end of the optical fiber 22 or of the contour fibers 21A and/or 21B can be coupled to a power input. Obviously, the optical fiber 22 is connected to an output downstream of the spiral. Moreover, contour fibers 21A and 21B can be made of many sections in order to increase the number of pump inputs.

Referring to FIG. 6, another arrangement of the optical fiber 22 in accordance with the optical fiber system 20 is shown at 60. In this arrangement, the optical fiber 22 is spiraled on a surface to form a two-dimensional spiral (i.e., a disk). Once more, a portion of the optical fiber 22 has been removed to illustrate the cross-section. Although the above-described arrangements are preferred, other arrangements can be used to cause exposed portions of the first cladding 24 to be side by side.

Figure 7A:
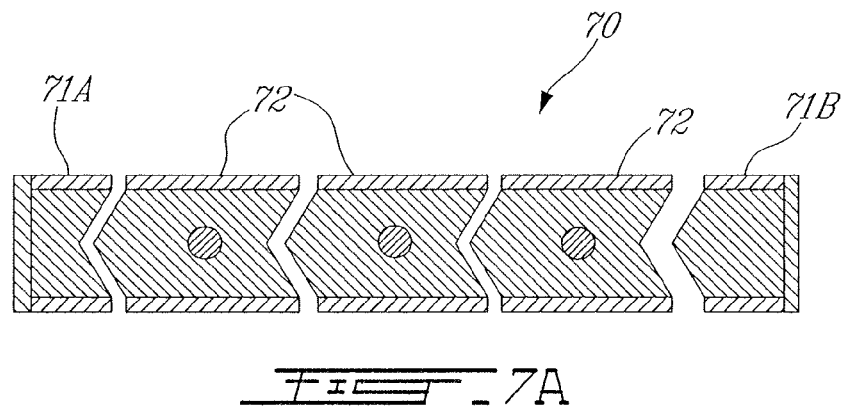
FIG. 7A is a cross-section view of the optical fiber system in accordance with a second embodiment of the present invention.
Figure 7B:
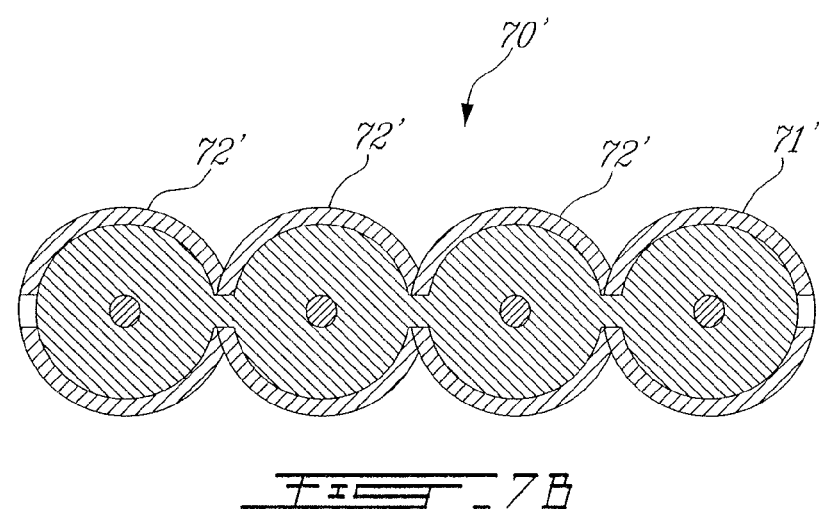
FIG. 7B is a cross-section view of the optical fiber system in accordance with a third embodiment of the present invention.
Figure 7C:
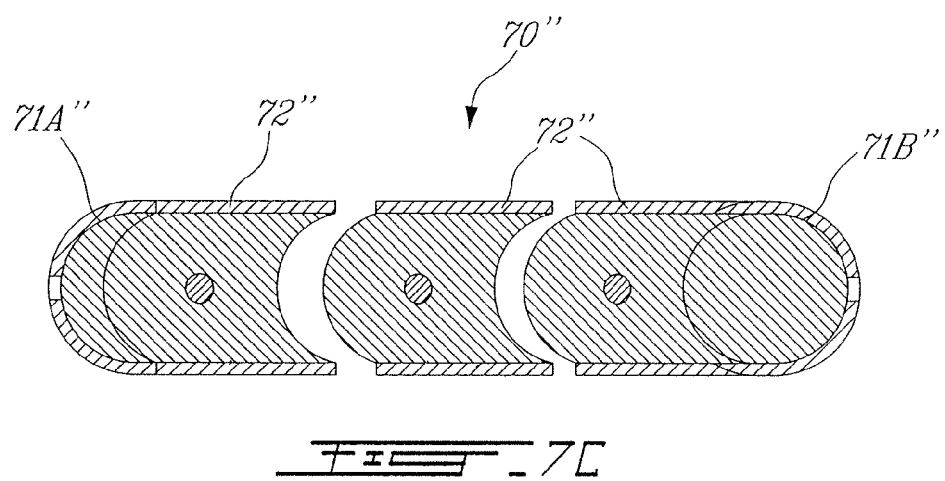
FIG. 7C is a cross-section view of the optical fiber system in accordance with a fourth embodiment of the present invention.

Referring to FIGS. 7A, 7B and 7C, optical fibers 72, 72' and 72", respectively, of alternative cross-sections are shown, to give optical fiber systems 70, 70' and 70". The optical fiber systems 70, 70' and 70" are likely to be more costly to produce than the system 20 because, for example, of the two different contour fibers (generally illustrated at 71A, 71B in FIG. 7A, 71' in FIG. 7B, and at 71A" and 71B" in FIG. 7C), and because of their more complex shapes. However, it is anticipated that the concave/convex coupling of the configurations 70 and 70" of FIGS. 7A and 7C, respectively, will improve the efficiency of respective fibers 72 and 72" due to improved contact therebetween.

Figure 8:
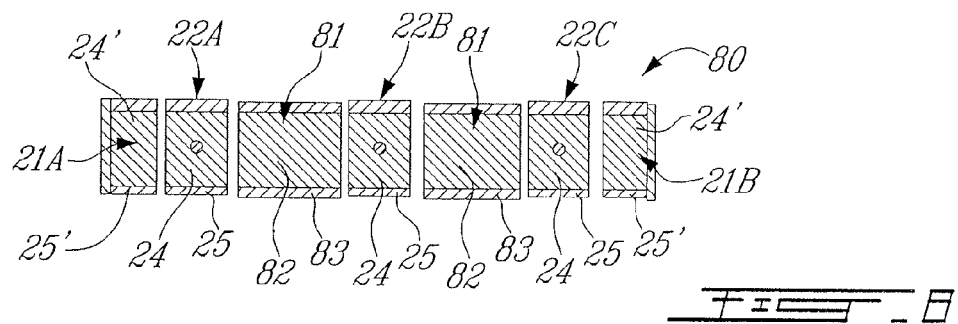
FIG. 8 is a cross-section view of the optical fiber system in accordance with a fifth embodiment of the present invention.
Figure 9:
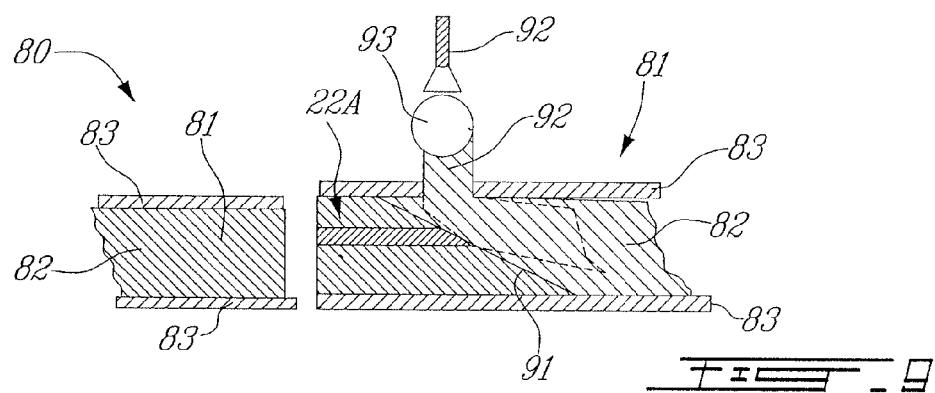
FIG. 9 is a schematic longitudinal cross-section of the optical fiber system of FIG. 8, in a coupling configuration with a power input.

Referring to FIG. 8, an optical fiber system in accordance with another embodiment of the present invention is shown at 80. The optical fiber system 80 is similar to the optical fiber system 20 of FIG. 2 in that it has the contour fiber 21A and 21B and the optical fiber 22 arranged, for instance, in a spiral to have fiber portions 22A, 22B and 22C longitudinally adjacent to one another. Additionally, a pumping fiber 81 is positioned between the fiber portions 22A and 22B, and 22B and 22C. The pumping fiber 81 has a core 82 and a fractional cladding 83. The core 82 has such properties, so as to enable light transmission therethrough from, for instance, the core portion 82 to the fiber portions 22A and 22B or to 22B and 22C. For instance, refractive index of core 82 and first cladding 24 are preferably of the same value. Moreover, the cladding 83 is preferably the same, or has the same properties, as the second cladding 25, to conceal the light with the core 82. The pumping fiber 81 is provided to couple input power to the optical fiber 22. As shown in FIG. 9, the pumping fiber 81 can have a beveled end at 45 degrees, whereat light 91 will be coupled therein from a power input, herein laser diode 92. An optical element 93 is provided to collimate light 91 so as to optimize the coupling of light into the pumping fiber 81. According to the arrangement of the optical fiber system 80 (e.g., in a 3-D spiral as in FIG. 5 or as a 2-D spiral according to FIG. 6), it is anticipated that the light coupled into the pumping fiber 80 will have reached the optical fiber 22 after one revolution and will have then mostly been absorbed by the doped core 23. Therefore, the pumping fiber 80 has a length generally equal to one turn of the spiral. This will make place for the embodiments of FIGS. 10 to 15, wherein this length of pumping fiber 81 allows for a plurality of laser diodes to be coupled to the optical fiber systems.

Figure 10:
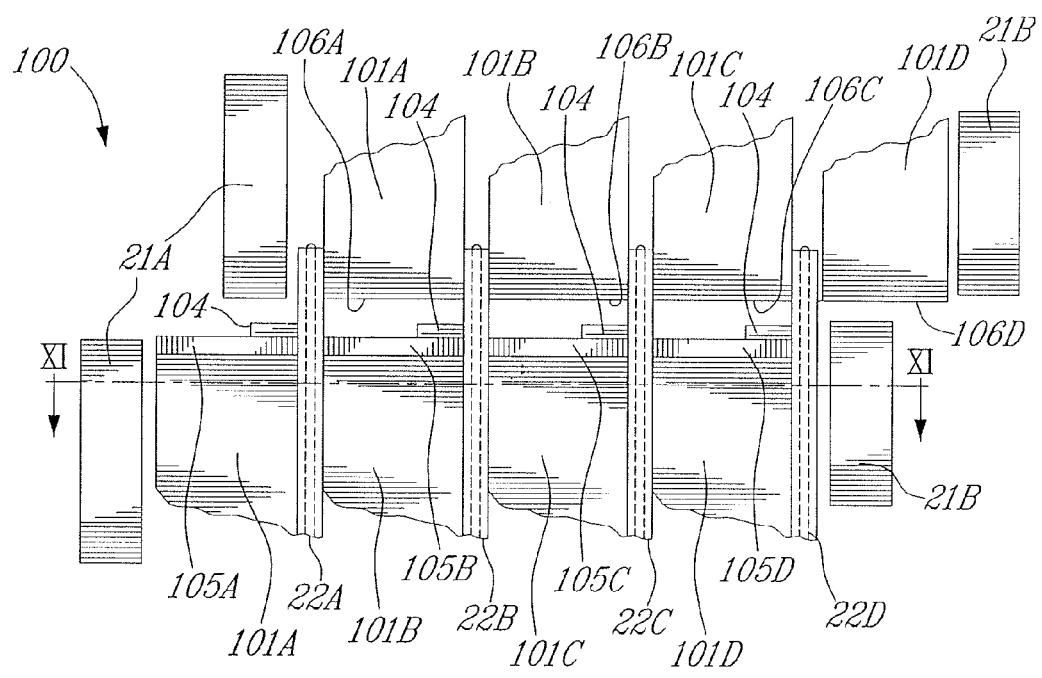
FIG. 10 is a top plan view of the optical fiber system in accordance with a sixth embodiment of the present invention, in a coupling configuration with a power input.

Referring to FIGS. 10 and 11, an optical fiber system in accordance with a further embodiment of the present invention is generally shown at 100. The optical fiber system 100 has the optical fiber 22, shown having four longitudinal portions, namely 22A, 22B, 22C and 22D, as well as the contour fibers 21A and 21B. Four pumping fibers 101, each having a core 102 and a cladding 103, are provided to couple light from laser diodes 104 (FIG. 10) into the optical fiber 22. In FIG. 10, the pumping fibers 101 and components thereof are affixed with a letter so as to be differentiated from one another. As mentioned previously, the pumping fibers 101 have a length generally equal to one revolution of the optical fiber 22, so each of the pumping fibers 101 is shown having a leading beveled end 105 and a trailing end 106. The leading ends 105 are opposite to the respective laser diodes 104. The trailing ends 106 are cut just short of one revolution in the given arrangement of the optical fiber system 100 (e.g., according to the arrangements of FIG. 5 or 6), whereby a subsequent pumping fiber 101 can be inserted between the optical fiber portions, to enable the leading beveled ends of the pumping fibers 101 to be aligned with the line/bar of laser diodes 104.

Referring to FIGS. 12 and 13, an optical fiber system in accordance with a further embodiment of the present invention is generally shown at 120. The optical fiber system 120 has all the same components as the optical fiber system 100 of FIG. 10, with additionally a spacing fiber 121. The optical fiber system 120 has the spacing fiber 121 so as to have the leading beveled ends 105 of the pumping fibers 101 each opposite one of the laser diodes 104. The spacing fiber 121 has a core 122 and a cladding 123, of suitable indexes of refraction for facilitating the coupling of light into the optical fiber 22. Fiber 121 can have a geometry (width) such that each fiber 101 is facing an emitter of a pump bar with a regular and predetermined pitch.

Referring to FIGS. 14 and 15, an optical fiber system in accordance with a further embodiment of the present invention is generally shown at 140. The optical fiber system 140 has all the same components as the optical fiber system 100 of FIG. 10. However, the leading beveled ends 105 of the pumping fibers 101 are positioned to be opposite to an array of laser diodes 141. Such an array is shown at 160 in FIG. 16 and can have as many emitters as desired.

I claim:

1. An optical fiber system comprising:
    an optical fiber having a doped core and a first cladding about the doped core, the optical fiber having a first longitudinal portion and a second longitudinal portion, the optical fiber being arranged such that the first longitudinal portion and the second longitudinal portion are longitudinally side by side with a portion of the first cladding of the first longitudinal portion being adjacent to a portion of the first cladding of the second longitudinal portion such that light propagating in the first cladding can move laterally from the first longitudinal portion to the second longitudinal portion to increase the amount of light reaching the doped core, the optical fiber adapted to be coupled to a power input to receive a light input and having an output end for outputting light emitted by the doped core; and a second fractional cladding about the first cladding to conceal light in the first cladding.

2. An optical fiber system comprising:

an optical fiber having a doped core, a first cladding about the doped core, and a second cladding partially covering the first cladding such that the first cladding is exposed longitudinally, the optical fiber having at least a first longitudinal portion and a second longitudinal portion, the optical fiber being arranged such that the first longitudinal portion and the second longitudinal portion are longitudinally side by side with an exposed portion of the first cladding of the first longitudinal portion being adjacent to an exposed portion of the first cladding of the second longitudinal portion such that light propagating in the first cladding can move laterally from the first longitudinal portion to the second longitudinal portion to increase the amount of light reaching the doped core, the optical fiber adapted to be coupled to a power input to receive a light input and having an output end for outputting light emitted by the doped core; and at least one contour fiber having an index of refraction as a function of the optical fiber, the at least one contour fiber covering further exposed portions of the first cladding of the doped core fiber to conceal light in the first cladding.

3. The optical fiber system according to claim 2, wherein the optical fiber is adapted to be coupled to a power input positioned with respect to the optical fiber so as to overlap each said longitudinal portion so as to increase a coupling surface between the power input and the optical fiber and to render independent the said coupling surface area from the core to cladding ratio of the said doped core fiber.

4. The optical fiber system according to claim 2, wherein the optical fiber is adapted to be coupled to a power input positioned opposite to at least one contour fiber.

5. The optical fiber system according to claim 2, wherein the optical fiber is longitudinally arranged in a spiral so as to have said longitudinal portions longitudinally side by side.

6. The optical fiber system according to claim 5, wherein said longitudinal portions are each one turn around said spiral.

7. The optical fiber system according to claim 2, wherein the at least one contour fiber has a core and a first cladding, the core of the at least one contour fiber being coplanar with said further exposed portions of the optical fiber, and the first cladding of the at least one contour fiber concealing light into the core of the at least one contour fiber.

8. The optical fiber system according to claim 2, wherein the first cladding has a rectangular cross-section, with the second cladding covering two opposed longitudinal surfaces of the first cladding such that exposed portions of the first cladding are the remaining two opposed longitudinal surfaces of the first cladding.

9. The optical fiber system according to claim 2, further comprising at least one pumping optical fiber between portions of adjacent ones of the exposed portions of the first cladding, the pumping optical fiber having an input end adapted to receive a power input, the pumping optical fiber having at least a core with an index of refraction as a function of the optical fiber for coupling light of the power input to the first cladding of the doped optical fiber.

10. The optical fiber system according to claim 9, further comprising one of said pumping optical fiber between each said longitudinal portion, with each input end of said pumping optical fiber being adapted to receive light from said power input.

11. The optical fiber system according to claim 10, wherein the input ends are aligned so as to receive light from a bar of laser diodes.

12. The optical fiber system according to claim 10, wherein the input ends are positioned so as to receive light from an array of bars of laser diodes.

13. The optical fiber system according to claim 10, further comprising a spacing optical fiber, said spacing optical fiber having an index of refraction as a function of the optical fiber, said spacing optical fiber being selectively positioned between said doped optical fiber and said pumping optical fibers, the spacing optical fiber having a width enabling said input ends of the pumping optical fibers to each be opposite to a laser diode of an array of laser diodes.

* * * * *